(12) United States Patent
Yang et al.

(10) Patent No.: US 11,232,796 B2
(45) Date of Patent: Jan. 25, 2022

(54) VOICE ACTIVITY DETECTION USING AUDIO AND VISUAL ANALYSIS

(71) Applicant: Facebook, Inc., Menlo Park, CA (US)

(72) Inventors: Jun Yang, San Jose, CA (US); Joshua Bingham, Palo Alto, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 136 days.

(21) Appl. No.: 16/601,482

(22) Filed: Oct. 14, 2019

(65) Prior Publication Data

US 2021/0110830 A1  Apr. 15, 2021

(51) Int. Cl.

| | | |
|---|---|---|
| G10L 15/24 | (2013.01) | |
| G06T 7/70 | (2017.01) | |
| G06T 7/00 | (2017.01) | |
| H04R 1/40 | (2006.01) | |
| G10L 15/22 | (2006.01) | |
| G10L 25/78 | (2013.01) | |
| G06K 9/00 | (2006.01) | |
| H04R 3/00 | (2006.01) | |

(52) U.S. Cl.
CPC .......... *G10L 15/24* (2013.01); *G06K 9/00228* (2013.01); *G06K 9/00362* (2013.01); *G06T 7/70* (2017.01); *G06T 7/97* (2017.01); *G10L 15/22* (2013.01); *G10L 25/78* (2013.01); *H04R 1/406* (2013.01); *H04R 3/005* (2013.01); *G06T 2207/10016* (2013.01)

(58) Field of Classification Search
USPC .......... 704/233, 246, 247, 251, 252
See application file for complete search history.

(56) References Cited

U.S. PATENT DOCUMENTS

| | | | |
|---|---|---|---|
| 10,531,187 B2* | 1/2020 | Knight | G07C 9/33 |
| 2003/0160862 A1* | 8/2003 | Charlier | H04N 5/2627 |
| | | | 348/14.08 |
| 2006/0075422 A1* | 4/2006 | Choi | G01S 3/7864 |
| | | | 725/18 |
| 2014/0085538 A1* | 3/2014 | Kaine | H04N 5/607 |
| | | | 348/462 |
| 2015/0022636 A1* | 1/2015 | Savransky | G06K 9/00228 |
| | | | 348/46 |
| 2016/0014540 A1* | 1/2016 | Kelly | G06F 3/013 |
| | | | 381/303 |
| 2017/0188140 A1* | 6/2017 | Duzinkiewicz | H04R 3/005 |
| 2018/0176680 A1* | 6/2018 | Knight | H04R 1/406 |
| 2019/0349678 A1* | 11/2019 | Janse | G10L 21/0216 |
| 2020/0304916 A1* | 9/2020 | Asfaw | H04R 3/005 |

* cited by examiner

*Primary Examiner* — Leonard Saint Cyr
(74) *Attorney, Agent, or Firm* — Fenwick & West LLP (57) ABSTRACT

A method of detecting voice activity includes performing a video analysis on a frame of video signal to determine a position of a user in the frame and to identify one or more beams of a corresponding audio signal associated with a region including the position of the user. The identified one or more beams of audio signal are analyzed to determine whether voice is present in the frame. When a user is not identified during the video analysis of the frame of video signal, audio analysis is not performed on the corresponding frame of audio signal.

18 Claims, 5 Drawing Sheets

```
┌─────────────────────────────────────┐
│ Receive video signal of an environ- │
│ ment within a field-of-view of the  │
│ image capturing device and audio    │
│ signal of the environment           │
│                 410                 │
└─────────────────────────────────────┘
                  │
                  ▼
┌─────────────────────────────────────┐
│ Detect a subject of interest in a   │
│ frame of the received video signal  │
│                 420                 │
└─────────────────────────────────────┘
                  │
                  ▼
┌─────────────────────────────────────┐
│ Determine a position of the subject │
│ of interest in the frame            │
│                 430                 │
└─────────────────────────────────────┘
                  │
                  ▼
┌─────────────────────────────────────┐
│ Identify at least one beam of the   │
│ plurality of beams associated with  │
│ a region inclusive of the position  │
│ of the subject of interest          │
│                 440                 │
└─────────────────────────────────────┘
                  │
                  ▼
┌─────────────────────────────────────┐
│ Determine whether voice is present  │
│ in the at least one beam corres-    │
│ ponding to the region inclusive of  │
│ the position of the subject of      │
│ interest                            │
│                 450                 │
└─────────────────────────────────────┘
                  │
                  ▼
┌─────────────────────────────────────┐
│ Output a voice activity detection   │
│ signal responsive to detecting that │
│ the voice is present                │
│                 460                 │
└─────────────────────────────────────┘
```

Fig. 4

VOICE ACTIVITY DETECTION USING AUDIO AND VISUAL ANALYSIS

BACKGROUND

This disclosure relates generally to detecting voice activity in an audio signal, and more specifically to detecting voice activity based in part on visual analysis.

With growing popularity of voice controlled devices and voice communication devices (e.g., smart phones, smart home devices), accurate detection of voice activity is an important application for receiving user input for these devices. For voice controlled devices and voice communication devices to detect a voice presence, the voice controlled devices conventionally operate in stand-by mode at all times and continuously analyze audio signal to determine when there is voice in the audio signal. This results in a large number of data samples being collected and processed, which takes significant computational resources. Furthermore, conventional methods for performing voice detection on the audio signal either require complex algorithms that are expensive to implement or sacrifice accuracy to keep costs low for the devices.

SUMMARY

Embodiments relate to detecting voice activity in a frame of an audio signal from an environment based on a combination of video analysis and audio analysis. A device may capture a video signal of the environment along with a corresponding audio signal, where the audio signal includes a plurality of beams that are each associated with a different region of the environment. For each frame of video signal, video analysis is performed to identify one or more beams that are likely to include voice activity by determining a position of a subject of interest in the frame of video signal and identifying one or more beams associated with a region including the position of the subject of interest. Following the video analysis, audio analysis is performed on the identified one or more beams to determine whether voice is present in the one or more beams. By performing audio analysis on the identified one or more beams instead of all of the beams, computational complexity is reduced.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
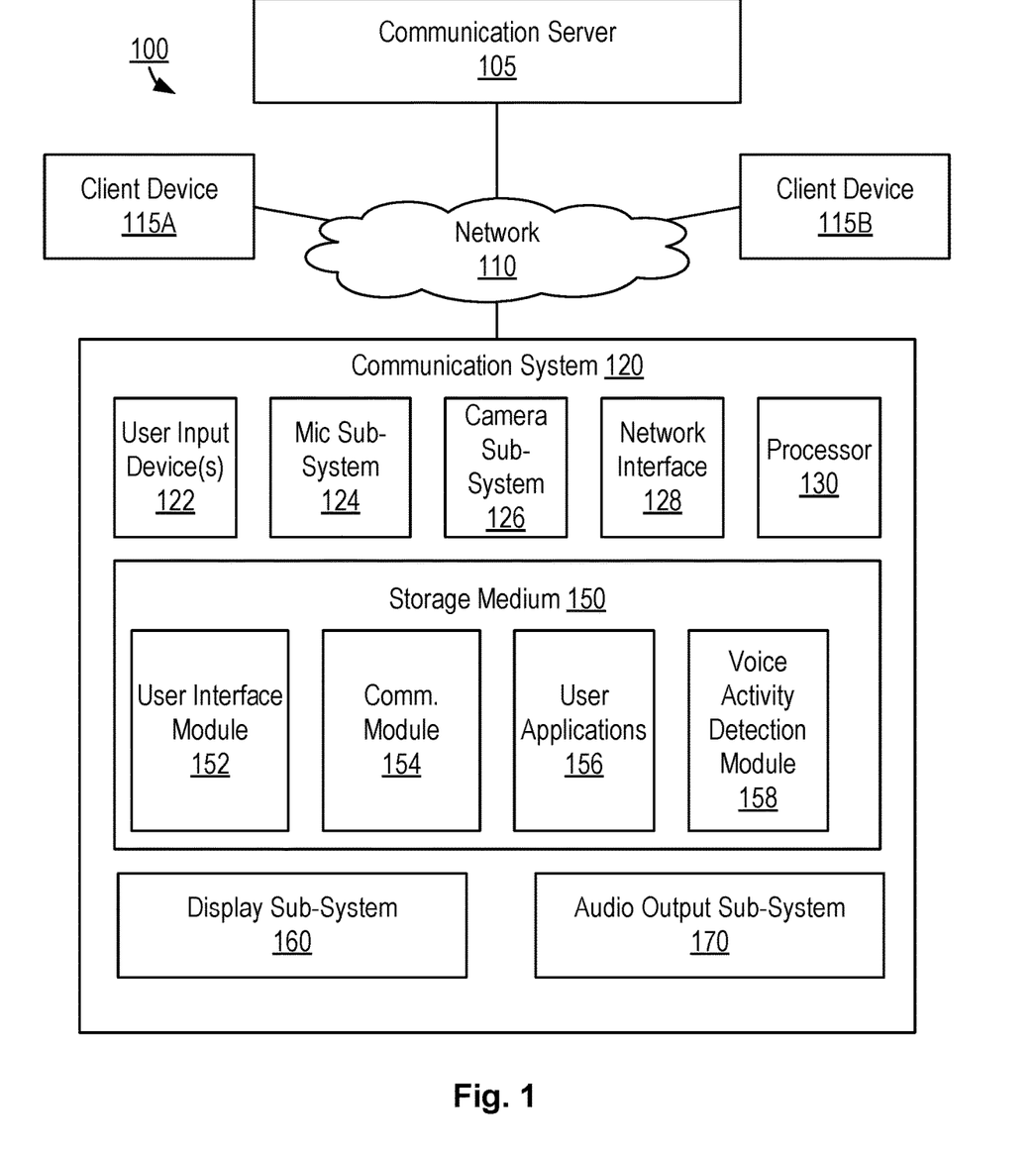
FIG. 1 is a block diagram of a system environment for a communication system, in accordance with an embodiment.

FIG. 1 is a block diagram of a system environment 100 for a communication system 120. The system environment 100 includes a communication server 105, one or more client devices 115 (e.g., client devices 115A, 115B), a network 110, and a communication system 120. In alternative configurations, different and/or additional components may be included in the system environment 100. For example, the system environment 100 may include additional client devices 115, additional communication servers 105, or additional communication systems 120.

In an embodiment, the communication system 120 comprises an integrated computing device that operates as a standalone network-enabled device. In another embodiment, the communication system 120 comprises a computing device for coupling to an external media device such as a television or other external display and/or audio output system. In this embodiment, the communication system may couple to the external media device via a wireless interface or wired interface (e.g., an HDMI cable) and may utilize various functions of the external media device such as its display, speakers, and input devices. Here, the communication system 120 may be configured to be compatible with a generic external media device that does not have specialized software, firmware, or hardware specifically for interacting with the communication system 120.

The client devices 115 are one or more computing devices capable of receiving user input as well as transmitting and/or receiving data via the network 110. In one embodiment, a client device 115 is a conventional computer system, such as a desktop or a laptop computer. Alternatively, a client device 115 may be a device having computer functionality, such as a personal digital assistant (PDA), a mobile telephone, a smartphone, a tablet, an Internet of Things (IoT) device, a video conferencing device, another instance of the communication system 120, or another suitable device. A client device 115 is configured to communicate via the network 110. In one embodiment, a client device 115 executes an application allowing a user of the client device 115 to interact with the communication system 120 by enabling voice calls, video calls, data sharing, or other interactions. For example, a client device 115 executes a browser application to enable interactions between the client device 115 and the communication system 105 via the network 110. In another embodiment, a client device 115 interacts with the communication system 105 through an application running on a native operating system of the client device 115, such as IOS® or ANDROID™.

The communication server 105 facilitates communications of the client devices 115 and the communication system 120 over the network 110. For example, the communication server 105 may facilitate connections between the communication system 120 and a client device 115 when a voice or video call is requested. Additionally, the communication server 105 may control access of the communication system 120 to various external applications or services available over the network 110. In an embodiment, the communication server 105 may provide updates to the communication system 120 when new versions of software or firmware become available. In other embodiments, various functions described below as being attributed to the communication system 120 can instead be performed entirely or in part on the communication server 105. For example, in some embodiments, various processing or storage tasks may be offloaded from the communication system 120 and instead performed on the communication server 105.

The network 110 may comprise any combination of local area and/or wide area networks, using wired and/or wireless communication systems. In one embodiment, the network 110 uses standard communications technologies and/or protocols. For example, the network 110 includes communication links using technologies such as Ethernet, 802.11 (WiFi), worldwide interoperability for microwave access (WiMAX), 3G, 4G, 5G, code division multiple access (CDMA), digital subscriber line (DSL), Bluetooth, Near Field Communication (NFC), Universal Serial Bus (USB), or any combination of protocols. In some embodiments, all or some of the communication links of the network 110 may be encrypted using any suitable technique or techniques.

The communication system 120 includes one or more user input devices 122, a microphone sub-system 124, a camera sub-system 126, a network interface 128, a processor 130, a storage medium 150, a display sub-system 160, and an audio sub-system 170. In other embodiments, the communication system 120 may include additional, fewer, or different components.

The user input device 122 comprises hardware that enables a user to interact with the communication system 120. The user input device 122 can comprise, for example, a touchscreen interface, a game controller, a keyboard, a mouse, a joystick, a voice command controller, a gesture recognition controller, a remote control receiver, or other input device. In an embodiment, the user input device 122 may include a remote control device that is physically separate from the user input device 122 and interacts with a remote controller receiver (e.g., an infrared (IR) or other wireless receiver) that may integrated with or otherwise connected to the communication system 120. In some embodiments, the display sub-system 160 and the user input device 122 are integrated together, such as in a touchscreen interface. In other embodiments, user inputs may be received over the network 110 from a client device 115. For example, an application executing on a client device 115 may send commands over the network 110 to control the communication system 120 based on user interactions with the client device 115. In other embodiments, the user input device 122 may include a port (e.g., an HDMI port) connected to an external television that enables user inputs to be received from the television responsive to user interactions with an input device of the television. For example, the television may send user input commands to the communication system 120 via a Consumer Electronics Control (CEC) protocol based on user inputs received by the television.

The microphone sub-system 124 comprises one or more microphones (or connections to external microphones) that capture ambient audio signals by converting sound into electrical signals that can be stored or processed by other components of the communication system 120. The captured audio signals may be transmitted to the client devices 115 during an audio/video call or in an audio/video message. Additionally, the captured audio signals may be processed to identify voice commands for controlling functions of the communication system 120. In an embodiment, the microphone sub-system 124 comprises one or more integrated microphones. Alternatively, the microphone sub-system 124 may comprise an external microphone coupled to the communication system 120 via a communication link (e.g., the network 110 or other direct communication link). The microphone sub-system 124 may comprise a single microphone or an array of microphones.

In the case of a microphone array, the microphone sub-system 124 may process audio signals from multiple microphones to generate one or more beamformed audio channels (or beams) each associated with a particular direction (or range of directions) in an environment surrounding the communication system 120. Each beam may correspond to a range of azimuth angles with respect to the communication system 120. The range of azimuth angles may overlap between two adjacent beams such that the no gaps exist between the regions covered by different beams. For example, there may be 6 beams that cover 360 degrees about the communication system 120. Each of the 6 beams may correspond to a range of 80 degrees such that there is an overlapping region of 20 degrees between pairs of adjacent beams that corresponds to both beams. A first beam may cover a range of 0 degrees to 80 degrees, a second beam may cover a range of 60 degrees to 140 degrees, a third beam may cover a range of 120 degrees to 200 degrees, a fourth beam may cover a range of 180 degrees to 260 degrees, a fifth beam may cover a range of 240 degrees to 320 degrees, and a sixth beam may cover a range of 300 degrees to 380 degrees (or 20 degrees).

The camera sub-system 126 comprises one or more cameras (or connections to one or more external cameras) that captures images and/or video signals. The captured images or video may be sent to the client device 115 during a video call or in a multimedia message, or may be stored or processed by other components of the communication system 120. Furthermore, in an embodiment, images or video from the camera sub-system 126 may be processed for face detection, face recognition, gesture recognition, or other information that may be utilized to control functions of the communication system 120. In an embodiment, the camera sub-system 126 includes one or more wide-angle cameras for capturing a wide, panoramic, or spherical field of view of a surrounding environment. The camera sub-system 126 may include integrated processing to stitch together images from multiple cameras, or to perform image processing functions such as zooming, panning, de-warping, or other functions. In an embodiment, the camera sub-system 126 may include multiple cameras positioned to capture stereoscopic (e.g., three-dimensional images) or may include a depth camera to capture depth values for pixels in the captured images or video. The camera sub-system 126 has a field-of-view based on characteristics of the one or more cameras, arrangement of the one or more cameras, position of the communication system 120 in the environment.

The network interface 128 facilitates connection of the communication system 120 to the network 110. For example, the network interface 128 may include software and/or hardware that facilitates communication of voice, video, and/or other data signals with one or more client devices 115 to enable voice and video calls or other operation of various applications executing on the communication system 120. The network interface 128 may operate according to any conventional wired or wireless communication protocols that enable it to communication over the network 110.

The display sub-system 160 comprises an electronic device or an interface to an electronic device for presenting images or video content. For example, the display sub-system 160 may comprises an LED display panel, an LCD display panel, a projector, a virtual reality headset, an augmented reality headset, another type of display device, or an interface for connecting to any of the above-described display devices. In an embodiment, the display sub-system 160 includes a display that is integrated with other components of the communication system 120. Alternatively, the display sub-system 160 comprises one or more ports (e.g., an HDMI port) that couples the communication system to an external display device (e.g., a television).

The audio output sub-system 170 comprises one or more speakers or an interface for coupling to one or more external speakers that generate ambient audio based on received audio signals. In an embodiment, the audio output sub-system 170 includes one or more speakers integrated with other components of the communication system 120. Alternatively, the audio output sub-system 170 comprises an interface (e.g., an HDMI interface or optical interface) for coupling the communication system 120 with one or more external speakers (for example, a dedicated speaker system or television). The audio output sub-system 170 may output audio in multiple channels to generate beamformed audio signals that give the listener a sense of directionality associated with the audio. For example, the audio output sub-system 170 may generate audio output as a stereo audio output or a multi-channel audio output such as 2.1, 3.1, 5.1, 7.1, or other standard configuration.

In embodiments in which the communication system 120 is coupled to an external media device such as a television, the communication system 120 may lack an integrated display and/or an integrated speaker, and may instead only communicate audio/visual data for outputting via a display and speaker system of the external media device.

The processor 130 operates in conjunction with the storage medium 150 (e.g., a non-transitory computer-readable storage medium) to carry out various functions attributed to the communication system 120 described herein. For example, the storage medium 150 may store one or more modules or applications (e.g., user interface 152, communication module 154, user applications 156, voice activity detection module 158) embodied as instructions executable by the processor 130. The instructions, when executed by the processor, cause the processor 130 to carry out the functions attributed to the various modules or applications described herein. In an embodiment, the processor 130 may comprise a single processor or a multi-processor system.

In an embodiment, the storage medium 150 comprises a user interface module 152, a communication module 154, user applications 156, and voice activity detection module 158. In alternative embodiments, the storage medium 150 may comprise different or additional components.

The user interface module 152 comprises visual and/or audio elements and controls for enabling user interaction with the communication system 120. For example, the user interface module 152 may receive inputs from the user input device 122 to enable the user to select various functions of the communication system 120. In an example embodiment, the user interface module 152 includes a calling interface to enable the communication system 120 to make or receive voice and/or video calls over the network 110. To make a call, the user interface module 152 may provide controls to enable a user to select one or more contacts for calling, to initiate the call, to control various functions during the call, and to end the call. To receive a call, the user interface module 152 may provide controls to enable a user to accept an incoming call, to control various functions during the call, and to end the call. For video calls, the user interface module 152 may include a video call interface that displays remote video from a client 115 together with various control elements such as volume control, an end call control, or various controls relating to how the received video is displayed or the received audio is outputted.

The user interface module 152 may furthermore enable a user to access user applications 156 or to control various settings of the communication system 120. In an embodiment, the user interface module 152 may enable customization of the user interface according to user preferences. Here, the user interface module 152 may store different preferences for different users of the communication system 120 and may adjust settings depending on the current user.

The communication module 154 facilitates communications of the communication system 120 with clients 115 for voice and/or video calls. For example, the communication module 154 may maintain a directory of contacts and facilitate connections to those contacts in response to commands from the user interface module 152 to initiate a call. Furthermore, the communication module 154 may receive indications of incoming calls and interact with the user interface module 152 to facilitate reception of the incoming call. The communication module 154 may furthermore process incoming and outgoing voice and/or video signals during calls to maintain a robust connection and to facilitate various in-call functions.

The user applications 156 comprise one or more applications that may be accessible by a user via the user interface module 152 to facilitate various functions of the communication system 120. For example, the user applications 156 may include a web browser for browsing web pages on the Internet, a picture viewer for viewing images, a media playback system for playing video or audio files, an intelligent virtual assistant for performing various tasks or services in response to user requests, or other applications for performing various functions. In an embodiment, the user applications 156 includes a social networking application that enables integration of the communication system 120 with a user's social networking account. Here, for example, the communication system 120 may obtain various information from the user's social networking account to facilitate a more personalized user experience. Furthermore, the communication system 120 can enable the user to directly interact with the social network by viewing or creating posts, accessing feeds, interacting with friends, etc. Additionally, based on the user preferences, the social networking application may facilitate retrieval of various alerts or notifications that may be of interest to the user relating to activity on the social network. In an embodiment, users may add or remove applications 156 to customize operation of the communication system 120.

The voice activity detection module 158 detects a presence of one or more voices in a frame of audio signal representing sound in an environment using a combination of visual analysis of a corresponding video signal and an audio analysis of the audio signals. The voice activity detection module 158 may receive video signals from the camera sub-system 126 and receive audio signals from the microphone sub-system 124. The received audio signals may be in the form of beams from the microphone sub-system 124, each beam representing sound from a particular region of the environment surrounding the communication system 120 corresponding to different directional channels. To reduce the size of audio signal to be analyzed, the voice activity detection module 158 identifies one or more beams to analyze for voice activity detection instead of analyzing all of the beams received from the microphone sub-system 124. To identify the one or more beam to perform audio processing on, the voice activity detection module 158 analyzes the corresponding video signal to visually detect a subject of interest within a frame of the video signal. Based on a position of the subject of interest within the frame of the video signal, the voice activity detection module 158 identifies one or more beams associated with a region including the position of the subject of interest for further audio analysis. After performing the audio analysis on the one or more beams, the voice activity detection module 158 outputs a voice activity detection signal indicative of a presence of human voice if determined that there is a voice present in the identified one or more beams.

Figure 2:
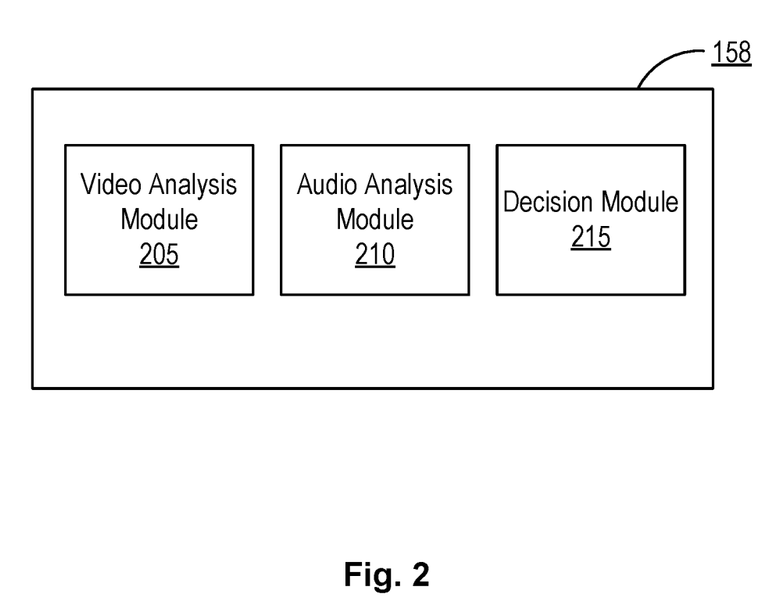
FIG. 2 is a block diagram of a voice activity detection module, in accordance with an embodiment.

FIG. 2 is a block diagram of a voice activity detection module 158, in accordance with an embodiment. The voice activity detection module 158 includes a video analysis module 205, an audio analysis module 210, and a decision module 215. In alternative configurations, different and/or additional modules may be included in the voice activity detection module. The voice activity detection module 158 may receive a video signal and a corresponding audio signal from the camera sub-system 126 and the mic sub-system 124, respectively. For each frame of video signal and audio signal that correspond to a predetermined time duration (e.g., 4 ms), the voice activity detection module 158 may perform video analysis and audio analysis to determine presence of voice in the frame.

The video analysis module 205 analyzes a video signal and determines a visual presence of a subject of interest in each frame of the video signal. The video analysis module 205 detects the subject of interest in a frame of video signal and determines a position of the subject of interest in the frame. Based on the position, the video analysis module 205 identifies one or more beams associated with a region in the environment that includes the position. In some embodiments, the subject of interest is a human user, and to detect the user, the video analysis module 205 uses a face detection algorithm to detect a human face in the frame of video signal. In other embodiments, other methods may be used to determine the position of the subject of interest. The video analysis module 205 may approximate the position of the user as a point where a feature of the user's face is located (e.g., location of the user's mouth), a center of the user's face, a center of the user's body, or other suitable points associated with the user. Once a point representing the position of the user is selected, an X-Y coordinate corresponding to the point is determined.

Figure 3A:
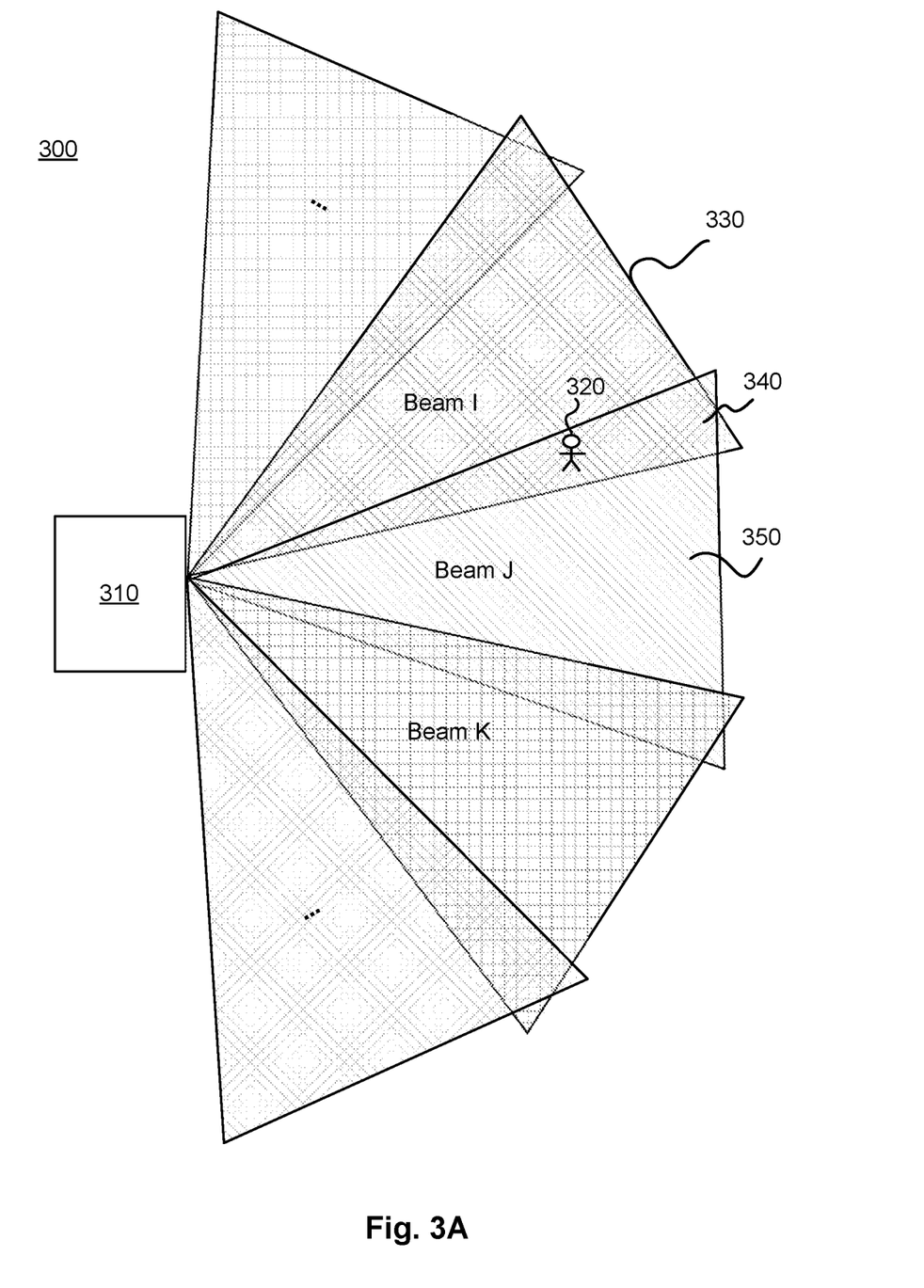
FIG. 3A illustrates regions within an environment around a client device viewed from a first perspective, in accordance with an environment.
Figure 3B:
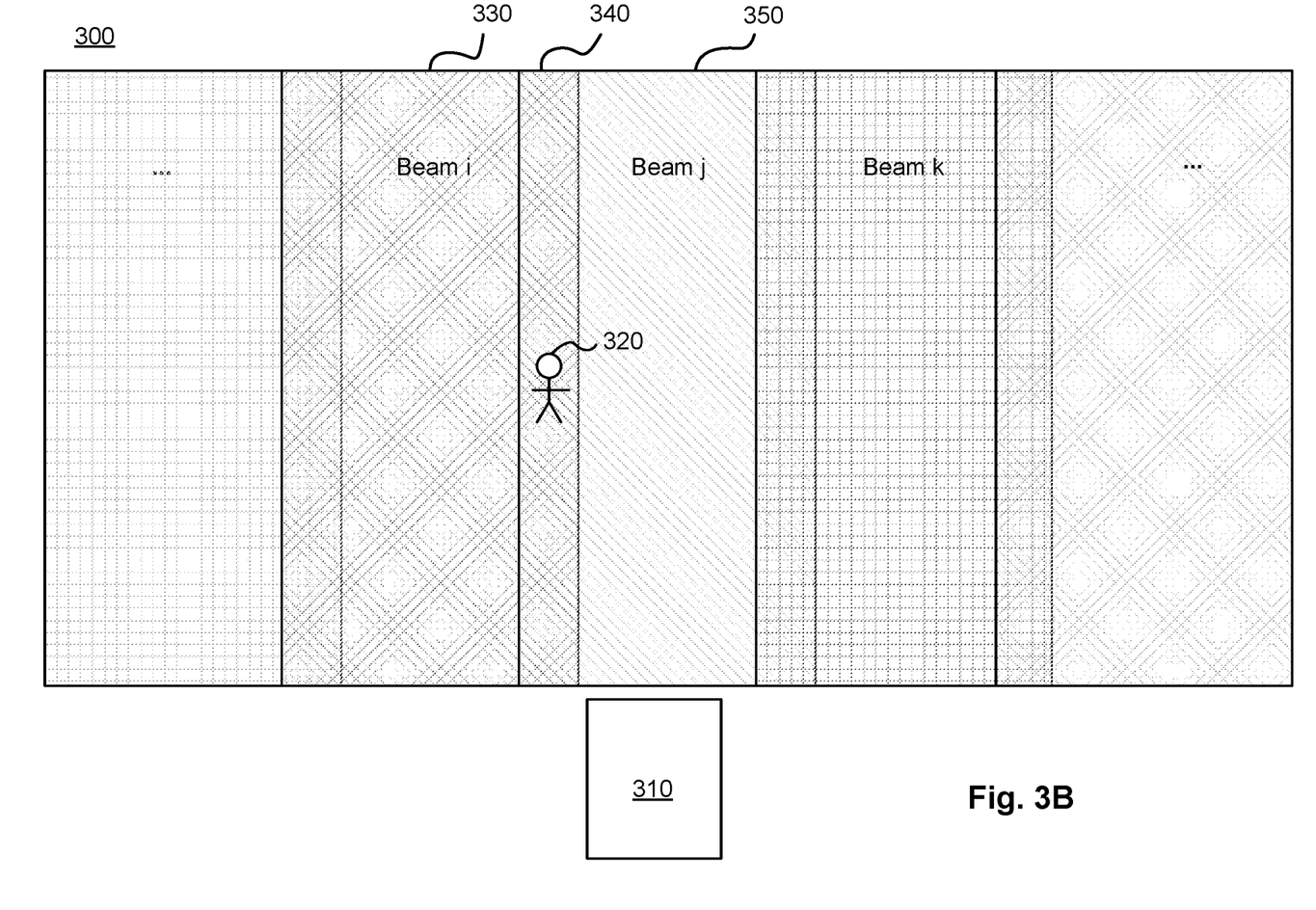
FIG. 3B illustrates the regions within the environment shown in FIG. 3A viewed from a second perspective, in accordance with an environment.

After determining the position of the subject of interest in the frame of video signal, the video analysis module 205 identifies one or more beams associated with a region that includes the position of the subject of interest. In some embodiments, the video analysis module 205 compares the point representing the position of the subject of interest to boundaries associated with each of the plurality of beams. In some embodiments, each beam corresponds to a range of azimuth angles with respect to the communication system 120. As illustrated in FIGS. 3A and 3B, the plurality of beams may be associated with different ranges of angles such that the position of the subject of interest may correspond to a single beam or two adjacent beams. To identify the one or more beams associated with the region that includes the position of the subject of interest, the video analysis module 205 may determine an azimuth angle of the position on the azimuth plane and determine which one or more beams are associated with angle ranges that include the angle of the position. In other embodiments, each beam corresponds to a region in the video signal bounded by a set of X-Y coordinates and the position of the subject of interest may be described as a point in the X-Y coordinates. After identifying the one or more beams associated with the region that includes the position of the subject of interest, the video analysis module 205 generates a video analysis output signal that identifies the one or more beams.

In some embodiments, the video analysis module 205 determines that the position of the subject of interest is included in a region corresponding to exactly one beam of the plurality of beams in a frame of video signal. In other embodiments, the video analysis module 205 determines that the position of the subject of interest is within an overlapping region corresponding to two adjacent beams in a frame of video signal. Based on the determination of the beams associated with the position, the video analysis module 205 generates a video analysis output signal identifying the one or more beams corresponding to the position and sends the video analysis output signal to the audio analysis module 210. Based on the video analysis output signal, the audio analysis module 210 performs an audio analysis on the identified one or more beams to determine whether there is voice presence in the one or more beams.

In some embodiments, a subject of interest may not be identified in the video signal. For example, the video analysis module 205 may perform face detection and determine that there is no subject of interest in the frame of video signal. The video analysis module 205 may generate a video analysis output signal that indicates that there is no subject of interest present and send the video analysis output signal to the decision module 215. The video analysis module 205 may also send the video analysis output signal to the audio analysis module 210 to indicate that there is no need for audio analysis in the frame.

In some embodiments, there are multiple subjects of interest in the frame of video signal. The video analysis module 205 detects the multiple subjects of interest. In some embodiments, the video analysis module 205 may use a face detection algorithm, motion analysis algorithm, join configuration analysis algorithm, or other suitable methods to detect the multiple subjects of interest. Once the multiple subjects of interest are detected, the video analysis module 205 determines positions of the subjects within the frame. For each of the multiple subjects, the video analysis module 205 identifies one or more beams that correspond to a region that includes the position of the subject. In some embodiments, a subject may be positioned in close proximity to one or more other subjects such that there are multiple subjects positioned in one region. In other embodiments, each of the subjects may be in a different region corresponding to a different set of one or more beams. After completing the video analysis, the video analysis module 205 may generate a video analysis output signal that indicates a number of identified subjects and one or more beams associated with regions including positions of the subjects.

For frames of video signals in which visual presence of a subject of interest is determined by the video analysis module 205, the audio analysis module 210 performs audio analysis on the one or more beams identified by the video analysis module. Based on a video analysis output signal from the video analysis module 205 identifying one or more beams to analyze for each frame of audio signal, the audio analysis module 210 dynamically performs audio processing on the one or more beams of the audio signal to determine a presence of a human voice in each of the one or more beams. For the audio analysis, the audio analysis module 210 may performs feature extraction from the one or more beams and determine whether the extracted features are indicative of a presence of human voice.

In some embodiments, the audio analysis module 210 may determine characteristics of each of the one or more beams by applying feature extraction algorithms to extract features from the one or more beams and comparing each of the extracted features to corresponding predefined criteria indicative of human voice. The feature extraction algorithms may determine feature such as a number of zero-crossings, a periodicity metric, an energy ratio between energy in a low frequency band and energy in a high frequency band, an envelope-to-floor ratio, or other features indicative of voice. Based on the comparison of each of the extracted features to its corresponding predefined criteria, the audio analysis module 210 determines whether the feature is indicative of human voice and generates an output signal for each of the features of each of the one or more beams. The output signals are sent to the decision module 215 and used by the decision module 215 to determine a final decision on whether voice is present in the frame.

When there is no human presence detected in the frame of video signal, the voice activity detection module 158 may bypass the audio analysis responsive to receiving a video analysis output signal indicating that there is no human presence in the video signal. The voice activity detection module 158 may send a signal to the decision module 215 that there is no voice present in the frame without having to perform audio analysis. Responsive to receiving the video analysis output signal that indicates that there is no human presence, the decision module 215 may generate a voice detection signal that there is no human voice and transmit the voice detection signal to a client device 115 or the communication server 105 via the network 110.

The decision module 215 determines a presence of human voice in a frame of audio signal based on video analysis performed by the video analysis module 205 and audio analysis performed by the audio analysis module 210.

In some embodiments, when there is no subject of interest detected by the video analysis module 205, the video analysis module 205 may send a video analysis output signal indicating that there is no subject of interest in the frame to the decision module 215. The decision module 215 may make a final decision that there is no human voice in the frame of audio signal based on the video analysis output signal without input from the audio analysis module 210. In other embodiments, the video analysis module 205 may first send the video analysis output signal to the audio analysis module 210, and the audio analysis module 210 may send an output analysis output signal to the decision module 215 indicating that there are no beams including voice activity.

In some embodiments, when at least one subject of interest is detected in the video analysis, the decision module 215 receives outputs from the audio analysis module 210 that extracts features from each of the identified beams associated with a position of the at least one subject of interest and determines whether the features are indicative of presence of human voice based on comparisons of the features to the respective predetermined criteria. Using results of the comparisons, the decision module 215 may determine an aggregate value for each of the one or more beams that represents an overall result of the feature comparisons of the individual features. For each of the one or more beams, the aggregate value is compared to a threshold, and if the aggregate value is greater than the threshold, the decision module 215 may determine that there is a human voice in the beam. If there are two beams associated with a subject of interest, the decision module 215 determines which of the two beams the voice of the subject exists in. The decision module 215 may select a beam with a higher aggregate value and compare the higher aggregate value to the threshold. If the high aggregate value exceeds the threshold value, the decision module 215 determines that voice of the subject is present in the beam with the higher aggregate value. Based on the presence determination, the decision module 215 generates a voice detection signal indicative of the presence of a human voice in the frame of audio signal and in which beam the voice exists. The voice detection signal may be transmitted to the client device 115 or to the communication server 105 via the network 110.

FIG. 3A illustrates regions within an environment 300 around a client device 310 viewed from a first perspective, in accordance with an environment.

As shown in FIG. 3A, sound from different regions of the environment 300 is captured by one or more microphones of the client device 310 and represented by beams. A beam is associated with an audio signal with a direction (or range of directions) with respect to the device 310. A number of beams, a size of regions covered by each of the beams, a location of the regions may vary depending on the type of the device.

As shown in FIG. 3A, the environment 300 is divided into a plurality of regions, each region corresponding to a beam of audio signal. In the example shown in FIG. 3A, a user 320 is located at an overlapping region 340 where a region I 330 associated with beam I and a region J 350 associated with beam J intersect. The client device 310 collects sound from the environment 300, and the sound is represented in a plurality of beams of audio signal (e.g., beams I, J, K, . . . ). The client device 310 also collects video signals of the environment 300, and identifies a position of the user 320 within the environment 300.

In some embodiments, to determine a position of the user 320 and to identify the one or more beams associated with the region 340 that includes the position of the user 320, the video analysis module 205 may apply a face detection algorithm and identify a face in the video signal. Once the face is identified, a position of the face is determined. In some embodiments, regions of the video data may be represented in areas bounded by a set of X-Y coordinates or ranges of azimuthal angles. Similarly, the position of the user 320 may be determined as a pair of X and Y coordinates or as an azimuthal angle relative to the device 310. The video analysis module 205 may retrieve coordinates or range of angles that represent boundaries of each of the beams, and compare to the position of the user 320 to determine which region includes the position of the user 320. The user 320 may be positioned in a region that corresponds to either a single beam or in a region that is an intersection of two adjacent beams.

FIG. 3B illustrates the regions within the environment 300 viewed from a second perspective, in accordance with an environment. FIG. 3B is representative of an image of the environment 300 generated using video signals of the environment 300, and the image may be divided into regions corresponding to different beams. Each of the different beams is associated with a region, and two adjacent beams have an overlap region. For example, region I 330 corresponds to beam I and is adjacent to region J 350. Between region I 330 and region J 350, there is an overlap region 340 that corresponds to both beam I and beam J.

Figure 4:
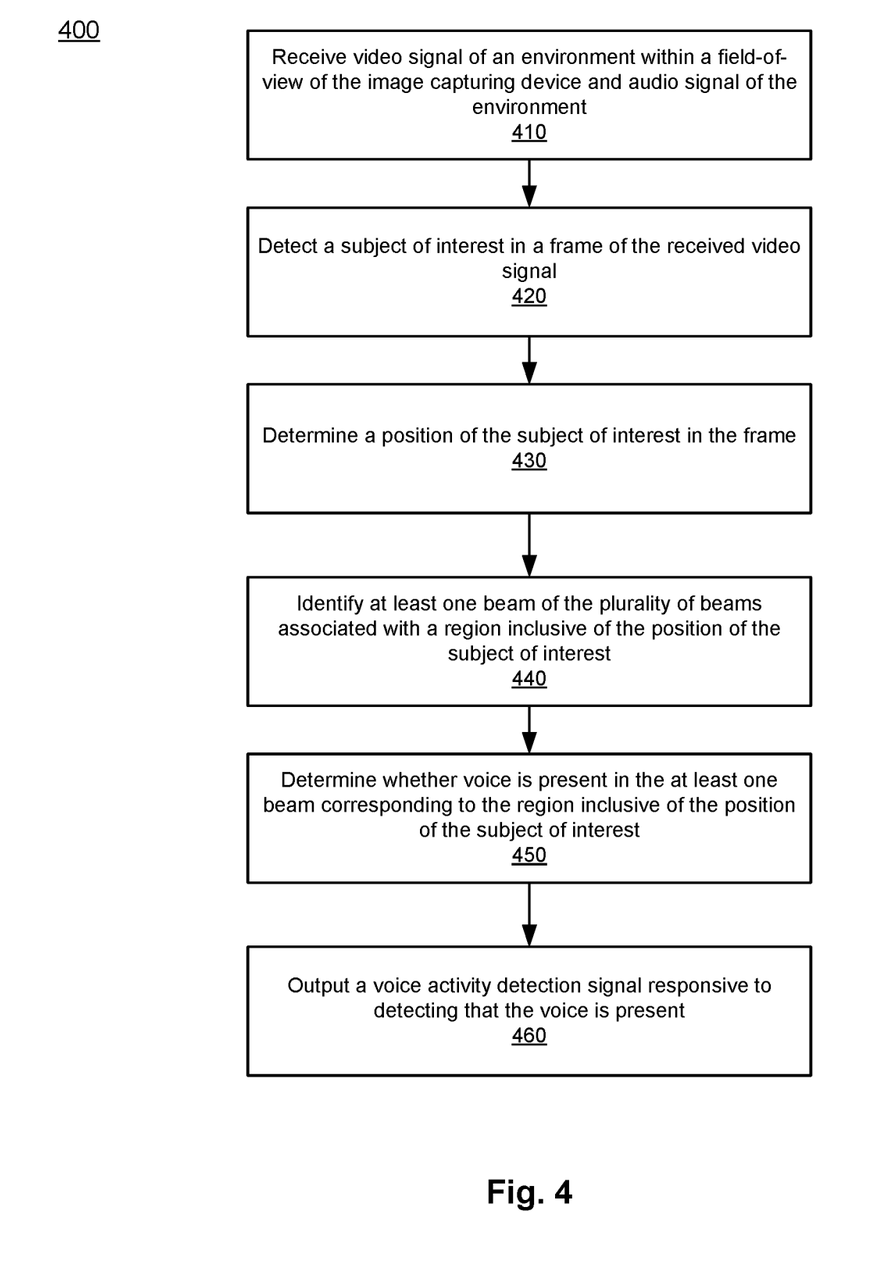
FIG. 4 is a flowchart illustrating a process for voice activity detection, in accordance with an embodiment.

FIG. 4 is a flowchart illustrating a process 400 for voice activity detection, in accordance with an embodiment. The process 400 may include different or additional steps than those described in conjunction with FIG. 4 or in different orders than the order described in conjunction with FIG. 4.

A voice activity detection module of a device including an image capturing device and an audio recording device receives 410 a video signal of an environment within a field-of-view of the image capturing device and an audio signal of the environment. The audio signal includes a plurality of audio beams that are each associated with a different region of the environment. The different regions may correspond to different ranges of azimuthal ranges with respect to the device.

The voice activity detection module detects 420 a subject of interest in a frame of the received video signal. The subject of interest may be a human user, and the voice activity detection module performs face detection on the video signal to identify a face in the frame. Responsive to detecting the subject of interest, the voice activity detection module determines 430 a position of the subject of interest in the frame. The voice activity detection module then identifies 440 at least one beam of the plurality of beams associated with a region inclusive of the position of the subject of interest. The region inclusive of the position may correspond to exactly one beam of the plurality of beams or may correspond to two adjacent beams.

After identifying the at least one beam, the voice activity detection module determines 450 whether voice is present in the at least one beam corresponding to the region inclusive of the position of the subject of interest. The voice activity detection module performs audio analysis on each of the at least one beam to determine which of the at least one beam includes a voice. Responsive to detecting voice in the one or more beans, the voice activity detection module outputs 460 a voice activity detection signal indicative of presence of voice.

The voice activity detection module may be implemented in any device that processes audio data such as a voice control device or a voice communication device. Voice activity detection is a useful application in noise cancellation because it can be used to establish a baseline background noise signal to remove from an audio signal. For example, the voice activity detection module may detect when that there is no voice presence and capture an audio signal of the environment with no voice presence to be used as an estimate for background noise. The captured audio signal can then be used by a voice communication device to reduce noise level in the audio signal during a call. Voice activity detection can also be used for echo cancellation by determining when a user has stopped speaking as a signal to start searching for an echo in the audio signal and to remove the echo.

ADDITIONAL CONSIDERATIONS

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:
1. A method comprising:
receiving, from a client device including an image capturing device and an audio recording device, a video signal of an environment within a field-of-view of the image capturing device and an audio signal of the environment, the audio signal comprising a plurality of audio beams each associated with a different region of the environment;
detecting a subject of interest in a frame of the received video signal;
determining a position of the subject of interest in the frame;
for a first audio beam of the plurality of audio beams, determining whether a first region corresponding to the first audio beam includes the position of the subject of interest;
responsive to determining that the first region includes the position of the subject of interest, determining whether voice is present in the first audio beam;
for a second audio beam of the plurality of audio beams, determining whether a second region corresponding to the second audio beam includes the position of the subject of interest;

responsive to determining that the second region does not include the position of the subject of interest, not determining whether voice is present in the second audio beam; and
outputting a voice activity detection signal responsive to detecting that voice is present.

2. The method of claim 1, wherein the audio recording device includes a plurality of microphones.

3. The method of claim 1, wherein determining whether the first region corresponding to the first audio beam includes the position of the subject of interest comprises:
retrieving boundaries of the first region;
comparing the position of the subject of interest in the frame to the boundaries of the first region; and
based on the comparison, determining whether the position of the subject of interest is within the boundaries of the first region.

4. The method of claim 1, further comprising:
identifying a second subject of interest in the frame;
determining a position of the second subject of interest, the position of the second subject of interest different from the position of the first subject of interest;
for a third audio beam of the plurality of audio beams, determining whether a third region corresponding to the third audio beam includes the position of the second subject of interest; and
responsive to determining that the third region includes the position of the second subject of interest, determining whether voice is present in the third audio beam.

5. The method of claim 1, wherein each audio beam of the plurality of audio beams corresponds to a range of azimuth angles with respect to the client device.

6. The method of claim 1, wherein detecting the subject of interest in the frame of the received video signal comprises:
performing face detection on the received video signal to identify a face in the frame.

7. The method of claim 1, wherein the video signal includes a plurality of frames, each frame corresponding to a predetermined time duration.

8. The method of claim 1, further comprising:
determining a presence of the subject of interest in a subsequent frame of the received video signal; and
responsive to determining that the subject of interest is not in the subsequent frame, skipping voice activity detection during the subsequent frame.

9. The method of claim 1, further comprising:
for a third audio beam of the plurality of audio beams adjacent to the first audio beam, determining whether a third region corresponding to the third audio beam includes the position of the subject of interest; and
responsive to determining that the third region includes the position of the subject of interest, determining whether voice is present in the third audio beam, wherein the position of the subject of interest is in an overlapping region of the first region and the third region.

10. A non-transitory computer-readable medium comprising computer program instructions that when executed by a computer processor of an online system cause the processor to perform steps comprising:
receiving, from a client device including an image capturing device and an audio recording device, a video signal of an environment within a field-of-view of the image capturing device and an audio signal of the environment, the audio signal comprising a plurality of audio beams each associated with a different region of the environment;
detecting a subject of interest in a frame of the received video signal;
determining a position of the subject of interest in the frame;
for a first audio beam of the plurality of audio beams, determining whether a first region corresponding to the first audio beam includes the position of the subject of interest;
responsive to determining that the first region includes the position of the subject of interest, determining whether voice is present in the first audio beam;
for a second audio beam of the plurality of audio beams, determining whether a second region corresponding to the second audio beam includes the position of the subject of interest;
responsive to determining that the second region does not include the position of the subject of interest, not determining whether voice is present in the second audio beam; and
outputting a voice activity detection signal responsive to detecting that voice is present.

11. The non-transitory computer-readable medium of claim 10, wherein the audio recording device includes a plurality of microphones.

12. The non-transitory computer-readable medium of claim 10, wherein determining whether the first region corresponding to the first audio beam includes the position of the subject of interest comprises:
retrieving boundaries of the first region;
comparing the position of the subject of interest in the frame to the boundaries of the first region; and
based on the comparison, determining whether the position of the subject of interest is within the boundaries of the first region.

13. The non-transitory computer-readable medium of claim 10, further causing the processor to perform additional steps comprising:
identifying a second subject of interest in the frame;
determining a position of the second subject of interest, the position of the second subject of interest different from the position of the first subject of interest;
for a third audio beam of the plurality of audio beams, determining whether a third region corresponding to the third audio beam includes the position of the second subject of interest; and
responsive to determining that the third region includes the position of the second subject of interest, determining whether voice is present in the third audio beam.

14. The non-transitory computer-readable medium of claim 10, further causing the processor to perform additional steps comprising:
for a third audio beam of the plurality of audio beams adjacent to the first audio beam, determining whether a third region corresponding to the third audio beam includes the position of the subject of interest; and
responsive to determining that the third region includes the position of the subject of interest, determining whether voice is present in the third audio beam, wherein the position of the subject of interest is in an overlapping region of the first region and the third region.

15. A system comprising:
a processor; and
a non-transitory computer-readable medium comprising computer program instructions that when executed by the processor of an online system causes the processor to perform steps comprising:
- receiving, from a client device including an image capturing device and an audio recording device, a video signal of an environment within a field-of-view of the image capturing device and an audio signal of the environment, the audio signal comprising a plurality of audio beams each associated with a different region of the environment;
- detecting a subject of interest in a frame of the received video signal;
- determining a position of the subject of interest in the frame;
- for a first audio beam of the plurality of audio beams, determining whether a first region corresponding to the first audio beam includes the position of the subject of interest;
- responsive to determining that the first region includes the position of the subject of interest, determining whether voice is present in the first audio beam; and
- for a second audio beam of the plurality of audio beams, determining whether a second region corresponding to the second audio beam includes the position of the subject of interest;
- responsive to determining that the second region does not include the position of the subject of interest, not determining whether voice is present in the second audio beam; and
- outputting a voice activity detection signal responsive to detecting that voice is present.

16. The system of claim 15, wherein the audio recording device includes a plurality of microphones.

17. The system of claim 15, wherein determining whether the first region corresponding to the first audio beam includes the position of the subject of interest comprises:
- retrieving boundaries of the first region;
- comparing the position of the subject of interest in the frame to the boundaries of the first region; and
- based on the comparison, determining whether the position of the subject of interest is within the boundaries of the first region.

18. The system of claim 15, further causing the processor to perform additional steps comprising:
- for a third audio beam of the plurality of audio beams adjacent to the first audio beam, determining whether a third region corresponding to the third audio beam includes the position of the subject of interest; and
- responsive to determining that the third region includes the position of the subject of interest, determining whether voice is present in the third audio beam, wherein the position of the subject of interest is in an overlapping region of the first region and the third region.

* * * * *